Jan. 8, 1957    R. GOODMAN ET AL    2,776,673
FLOW RESTRICTOR
Filed Feb. 14, 1952

INVENTORS
Robert Goodman
Victor Baptist
BY Alfred R. Page
ATTORNEY

United States Patent Office 2,776,673
Patented Jan. 8, 1957

2,776,673

FLOW RESTRICTOR

Robert Goodman and Victor Baptist, Stamford, Conn., assignors to Gar Precision Parts, Inc., Stamford, Conn., a corporation of Delaware Application February 14, 1952, Serial No. 271,531

15 Claims. (Cl. 137—493)

This invention relates to fluid flow control devices and, more particularly, to a self clearing metering flow restrictor readily presettable for a number of different types of flow control.

Flow restrictors are used in fluid lines to control or limit surging or hunting of operated devices. These lines also include metering means for assuring a pre-set fluid flow rate corresponding to optimum operational rates. The metering means, as well as the restrictor, may involve a relatively small orifice likely to become clogged or blocked by foreign matter in the fluid supply. Cleaning of these orifices generally requires disconnection of the fuel line to obtain access thereto. When such systems are at high pressure, cleaning of the orifices is sometimes impossible to effect.

In accordance with the present invention, a flow restrictor is provided comprising a body relatively readily coupled between sections of a flow line. This body contains a metering orifice aligned with the fluid flow direction, and a variable cross section plunger or cylinder is mounted for reciprocation coaxially of the orifice. The metered flow area is thus annular and is the difference between the orifice area and the cross-sectional area of the portion of the plunger then within the orifice. A feature of the invention is that the metering orifice need not be accurately dimensioned, accurate regulation of flow being obtained by adjusting the rod relative to the orifice.

The plunger is provided with adjustably positioned abutments disposed in the fluid flow path and acted upon by the fluid to shift the plunger in the direction of fluid flow. Thus, each time the flow direction is reversed, the plunger moves axially of the orifice tending to clean foreign matter therefrom.

The adjustable abutments provide for pre-setting the flow rate for either direction between full flow and complete stoppage. By the addition of a compression spring, the flow restrictor may be made to function as a surge snubber for the fluid flow.

For an understanding of the invention principles, reference is made to the following description of typical embodiments thereof as illustrated in the accompanying drawing. In the drawing.

Figure 1:
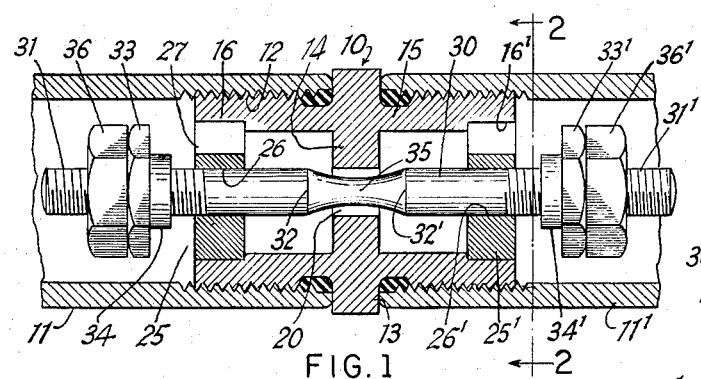
Fig. 1 is an axial sectional view through a flow restrictor embodying the invention, connected in a fluid line.
Figure 2:
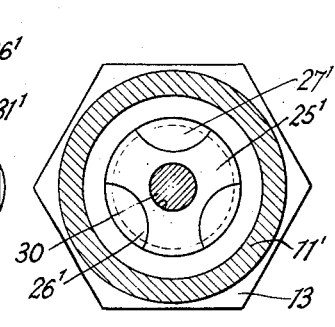
Fig. 2 is a diametric sectional view on the line 2—2 of Fig. 1.

Referring to Figs. 1 and 2, the invention flow restrictor 10 is illustrated as connecting a pair of sections 11, 11' of a fluid flow line such as, for example, a hydraulic control line of an aircraft. Restrictor 10 comprises an elongated, substantially tubular body 15 having threaded ends 12, 12' for connection to flow element 11, 11', respectively. Intermediate its ends, body 15 has an outwardly projecting radial flange 13 which may have a polygonal periphery, if desired, to receive a wrench for coupling operations.

In alignment with flange 13 is a radially inwardly extending flange 14 having a metering orifice 20 at the axis of restrictor 10. The ends of body 15 are closed by relatively thick end plates 25, 25' seated in recesses 16, 16' in body 15. Plates 25, 25' have central apertures 26, 26' therein, each coaxial with orifice 20 and exactly equal thereto in diameter. Each plate 25 also has a series of relatively deep, circumferentially spaced arcuate recesses 27, 27' in its periphery, forming flow openings.

A plunger rod 30, having threaded ends 31, 31' and a general diameter equal to that of orifice 20 and apertures 26, 26' is slidably mounted through the orifice and the apertures, the threaded ends 31, 31' projecting equally beyond plates 25, 25' when the rod 30 is centered in body 10. The central section of rod 30, for a length equal to approximately twice the thickness of flange 14, is reduced in diameter as at 35. This reduction is progressively effected from each of a pair of shoulders 32, 32' toward the mid point of section 35, so that, in axial section, the surface of section 35 preferably is defined by arcs of two equal and relatively large circles each centered equidistant from the axis of rod 30 and on a line through the mid-point of section 35 and perpendicular to the rod axis.

Threaded on each end 31, 31' of rod 30 is a stop limit nut 33 or 33' having a reduced inner shoulder 34, 34' of a diameter less than that of the circle tangent to the inner edges of flow apertures 27, 27'. Shoulders 34, 34' prevent nuts 33, 33' blocking the apertures 27, 27'. A lock nut 36, 36' is associated with each adjustment nut 33, 33'.

The flow area through the restrictor is equal to the cross sectional area of metering orifice 20 less the cross sectional area of that part of rod 30 at the upstream edge of the orifice during any particular flow interval. Maximum flow is thus effected when the rod 30 is exactly centered longitudinally relative to the orifice flange, and the flow is blocked when either shoulder 32, 32' is at or inwardly of a surface of flange 14. These relations are pre-set by adjustment of nuts 33, 33' locked in position by lock nuts 36, 36'.

As the flow is reversed in direction, rod or plunger 30 moves axially of the restrictor and of orifice 20. This action clears any foreign matter from the orifice on each flow reversal. The movement of the rod is due to the pressure of the fluid acting on either end and along rod 30. It is virtually impossible for the orifice 20 to clog, due to the self cleaning action resulting from reciprocation of rod 30. The cleaning effect on the orifice is enhanced by the reduced mid-section of rod 30, which provides a greater flow opening allowing for free passage of particles through orifice 20 as rod 30 moves in either direction.

Fig. 1 illustrates the restrictor as arranged for equal metered flow in each direction. To meter the flow, lock nuts 36, 36' are loosened and adjustment nuts 33, 33' positioned so that, when either shoulder 34, 34' engages an end plate, the corresponding shoulder 32, 32' at the ends of reduced rod section 35 will be set at a distance from the face of flange 14 sufficient to provide the desired annular flow area between the surface of orifice 20 and the surface of section 35. Thus, the further an adjustment nut is backed off, the less will be the net flow area through the orifice. When both nuts 33, 33' are set in the same position, lock nuts 36, 36' are retightened.

Figure 3:
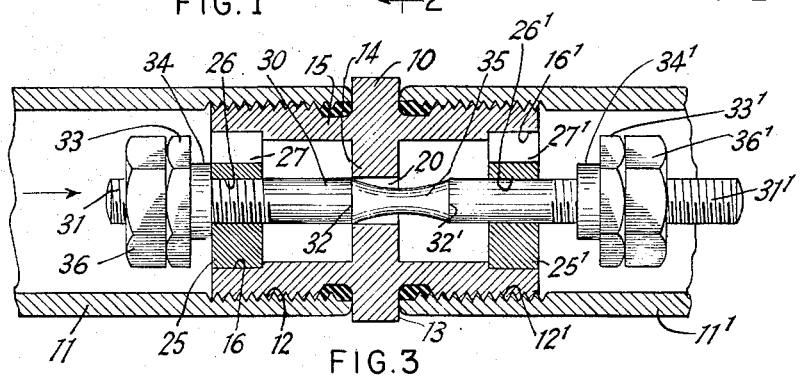
Figs. 3 and 4 are views, similar to Fig. 1, illustrating the restrictor pre-set for different types of flow control.

In Fig. 3, the restrictor 10 is adjusted to provide metered flow in one direction and block flow in the opposite direction. Nut 36 is loosened and nut 33 backed off until shoulder 32 is substantially at or slightly within orifice 20, the rod 30 thus filling orifice 20 and blocking flow to the right. Nut 36' is then loosened and nut 33' set so that shoulder 32' is at the right distance from the orifice 20 to provide the desired net flow area through the orifice. Nut 36' is then retightened against nut 33'.

Figure 4:
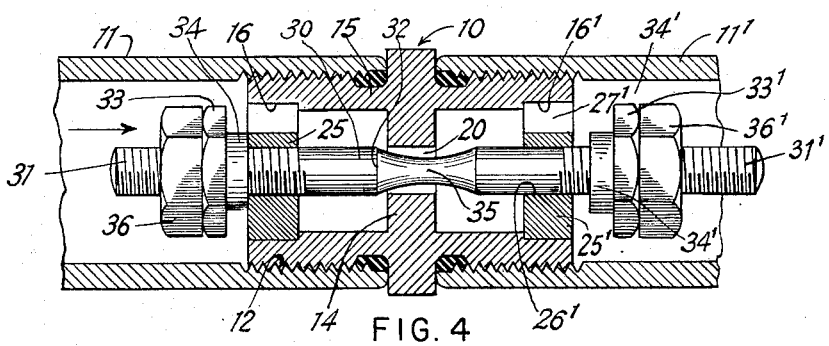

In Fig. 4, the nuts 33, 33' have been set so that there is metered flow to the right, when shoulder 34 engages plate 25, and unrestricted flow to the left. This is effected by setting nut 33' so that, when shoulder 34' engages plate 25', reduced section 35 is centered relative to orifice 20.

Figure 5:
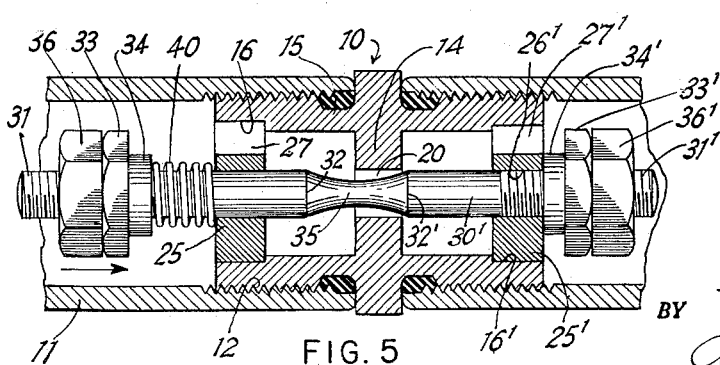
Fig. 5 is a view, similar to Fig. 1, illustrating the restrictor as arranged to operate as a surge snubber.

Fig. 5 shows the restrictor 10 slightly modified to provide a snubbing or shock absorbing action on the fluid flow. A coil spring 40 embraces rod 30 between plate 25 and shoulder 34. Nut 33' is so adjusted that shoulder 32' is only slightly spaced from orifice 20 to thus restrict flow to the left when shoulder 34' engages plate 25'. Nut 33 is so adjusted that, when spring 40 is fully compressed, reduced section 35 is centered relative to orifice 20. Under steady conditions, the parts occupy the positions shown. If a surge occurs, spring 40 is compressed so that rod 30 moves further to the right providing a larger flow area through orifice 20. The freedom of flow through orifice 20 varies with the fluid pressure, the compression of spring 40 depending upon such fluid pressure.

The invention arrangement thus provides a flow restrictor, including a metering orifice, in which the orifice is automatically cleared of obstructions each time the fluid flow is reversed in direction. The restrictor is adjustable for a number of different flow combinations, varying from full blocking of the flow in either direction to substantially free flow in either direction. With the simple addition of a coil spring, the restrictor is easily converted into a surge snubber.

While specific embodiments have been shown and described in detail to illustrate the application of the invention principles, it will be understood that the invention may be embodied otherwise without departing from such principles.

What is claimed is:

1. A fluid flow restrictor comprising a body arranged for connection into a fluid flow line and having a flow metering orifice therein; a relatively elongated element extending through the orifice and mounted for axial movement in either direction relative to the orifice in accordance with the direction of fluid flow; said element having longitudinally spaced portions at least one of which has a cross-sectional area equal to that of the orifice and another of which has a cross-sectional area less than that of the orifice; fluid flow responsive means operable to shift said element, relative to the orifice, in the direction of flow; guide means for said element on either side of said orifice and spaced axially therefrom; and abutment means adjustably positioned along said element and directly engageable with said guide means only at the pre-set limit of movement of said element in each direction to control the range of movement of said element through the orifice to pre-set the positions of said spaced portions relative to the orifice to control the flow through the orifice; the movement of said element through the orifice dislodging foreign matter from the latter.

2. A fluid flow restrictor comprising a body arranged for connection into a fluid flow line and having a flow metering orifice therein; a relatively elongated element extending through the orifice and mounted for axial movement in either direction relative to the orifice in accordance with the direction of fluid flow, the cross-sectional area of at least a portion of said element varying longitudinally thereof from a value equal to that of the orifice to a value substantially less than that of the orifice; fluid flow responsive means operable to shift said element, relative to the orifice, in the direction of flow; guide means for said element on either side of said orifice and spaced axially therefrom; and adjustable means on said element engageable with said guide means for controlling the range of movement of said element through the orifice to pre-set the positions of said different cross-sectional area portions of the element relative to the orifice to control the flow through the orifice; the movement of said element through the orifice dislodging foreign matter from the latter.

3. A fluid flow restrictor comprising a body arranged for connection into a fluid flow line and having a flow metering orifice therein; a relatively elongated element extending through the orifice and mounted for axial movement in either direction relative to the orifice in accordance with the direction of fluid flow, the midpoint of said element having cross-sectional area substantially less than that of the orifice, and the cross-sectional area increasing progressively and continuously in both directions from the midpoint to a value equal to that of the orifice at points spaced equally from the midpoint; fluid flow responsive means operable to shift said element, relative to the orifice, in the direction of flow; and adjustable means controlling the range of movement of said element through the orifice to pre-set the positions of said different cross-sectional area portions of the element relative to the orifice to control the flow through the orifice; the movement of said element through the orifice dislodging foreign matter from the latter.

4. A fluid flow restrictor comprising a body arranged for connection into a fluid flow line and having a flow metering orifice therein; a relatively elongated element extending through the orifice and mounted for axial movement in either direction relative to the orifice in accordance with the direction of fluid flow, the midpoint of said element having cross-sectional area substantially less than that of the orifice, and the cross-sectional area increasing progressively and continuously in both directions from the midpoint to a value equal to that of the orifice at points spaced equally from the midpoint; the cross-sectional area of the element being uniform between each of said spaced points and the end of the element; fluid flow responsive means operable to shift said element, relative to the orifice, in the direction of flow; and adjustable means controlling the range of movement of said element through the orifice to pre-set the positions of said different cross-sectional area portions of the element relative to the orifice to control the flow through the orifice; the movement of said element through the orifice dislodging foreign matter from the latter.

5. A fluid flow restrictor comprising an elongated substantially tubular body arranged for connection into a fluid flow line and having a flow metering orifice therein and coaxial therewith; plate means at each end of the body, each having a central opening, equal in area to the orifice, and fluid flow apertures; a relatively elongated element extending through the orifice and such central openings mounted for axial movement relative to the orifice, said element having longitudinally spaced portions at least one of which has a cross-sectional area equal to that of the orifice and another of which has a cross-sectional area less than that of the orifice; fluid flow responsive means operable to shift said element, relative to the orifice, in the direction of flow; and means adjustably mounted on said element beyond the plate means and engageable with the latter to control the range of movement of said element through the orifice to pre-set the positions of said spaced portions relative to the orifice to control the flow through the orifice; the movement of said element through the orifice dislodging foreign matter from the latter.

6. A fluid flow restrictor comprising an elongated substantially tubular body arranged for connection into a fluid flow line and having a flow metering orifice therein and coaxial therewith; plate means at each end of the body, each having a central opening, equal in area to the orifice, and fluid flow apertures; a relatively elongated element extending through the orifice and such central openings mounted for axial movement relative to the orifice, the cross-sectional area of at least a portion of said element varying longitudinally thereof from a value equal to that of the orifice to a value substantially less than that of the orifice; fluid flow responsive means operable to shift said element, relative to the orifice, in the direction of flow; and means adjustably mounted on said element beyond the plate means and engageable with the latter to control the range of movement of said element through the orifice to pre-set the positions of said different cross-sectional area portions of the element relative to the orifice to control the flow through the orifice; the movement of said element through the orifice dislodging foreign matter from the latter.

7. A fluid flow restrictor comprising an elongated substantially tubular body arranged for connection into a fluid flow line and having a flow metering orifice therein and coaxial therewith; plate means at each end of the body, each having a central opening, equal in area to the orifice, and fluid flow apertures; a relatively elongated element extending through the orifice and such central openings mounted for axial movement relative to the orifice, the midpoint of said element having a cross-sectional area substantially less than that of the orifice, and the cross-sectional area increasing in both directions from the midpoint to a value equal to that of the orifice at points spaced equally from the midpoint; fluid flow responsive means operable to shift said element, relative to the orifice, in the direction of flow; and means adjustably mounted on said element beyond the plate means and engageable with the latter to control the range of movement of said element through the orifice to pre-set the positions of said spaced portions relative to the orifice to control the flow through the orifice; the movement of said element through the orifice dislodging foreign matter from the latter.

8. A fluid flow restrictor comprising an elongated substantially tubular body arranged for connection into a fluid flow line and having a flow metering orifice therein and coaxial therewith; plate means at each end of the body, each having a central opening, equal in area to the orifice, and fluid flow apertures; a relatively elongated element extending through the orifice and such central openings mounted for axial movement relative to the orifice, the midpoint of said element having a cross-sectional area substantially less than that of the orifice, and the cross-sectional area increasing in both directions from the midpoint to a value equal to that of the orifice at points spaced equally from the midpoint, the cross-sectional area of the element being uniform between each of said spaced points and the end of the element; fluid flow responsive means operable to shift said element, relative to the orifice, in the direction of flow; and means adjustably mounted on said element beyond the plate means and engageable with the latter to control the range of movement of said element through the orifice to pre-set the positions of said spaced portions relative to the orifice to control the flow through the orifice; the movement of said element through the orifice dislodging foreign matter from the latter.

9. A flow restrictor as claimed in claim 8 in which the orifice and central openings are circular, the element is cylindrical, and the apertures are in a circular series around the central openings.

10. A flow restrictor as claimed in claim 8 in which the adjustable means comprises nuts threaded onto the projecting ends of the element.

11. A flow restrictor as claimed in claim 8 in which the adjustable means comprises nuts threaded onto the projecting ends of the element, and the flow responsive means comprises stop nuts engaged with said adjustable nuts.

12. A flow restrictor as claimed in claim 8 in which the orifice and central openings are circular, the element is cylindrical, and the apertures are in circular series around the central openings; and in which the adjustable means comprises nuts threaded onto the projecting ends of the element, the flow responsive means comprises stop nuts engaged with said adjustable nuts.

13. A flow restrictor as claimed in claim 8 in which the orifice is formed in a central partition in the body.

14. A flow restrictor as claimed in claim 8 including resilient means embracing the element between one plate means and the adjacent adjustable means to bias the element in one direction and offer resistance to movement of the element in the opposite direction.

15. A fluid flow metering restrictor comprising a body arranged for connection into a fluid flow line and having a flow metering orifice therein; a relatively elongated element extending through the orifice and mounted for free axial movement in either direction relative to the orifice responsive to the direction of fluid flow; said element having a cross section area less than that of the orifice and correlated with the cross section area of the orifice to provide an annular metered flow area of the required amount; plate means in said body on either side of said orifice having apertures coaxial with said orifice and forming guiding means for said element; and axially spaced and adjustable stop means on said element beyond said plate means limiting movement of said element in either direction to position the element in the orifice; the movement of said element through the orifice dislodging foreign matter from the latter.

References Cited in the file of this patent

UNITED STATES PATENTS

| | | |
|---|---|---|
| 1,087,890 | Rogers | Feb. 17, 1914 |
| 1,170,050 | Daniels | Feb. 1, 1916 |
| 1,183,541 | Dake | May 16, 1916 |
| 1,441,485 | Dake | Jan. 9, 1923 |
| 1,798,536 | Hofmann | Mar. 31, 1931 |
| 1,799,266 | Wallace | Apr. 7, 1931 |
| 1,833,939 | Gibbs | Dec. 1, 1931 |
| 1,834,449 | Farmer | Dec. 1, 1931 |
| 1,914,028 | Knutzen | June 13, 1933 |
| 2,337,512 | Ward | Dec. 21, 1943 |
| 2,509,880 | Pelton | May 30, 1950 |
| 2,601,280 | Hays | June 24, 1952 |
| 2,621,885 | Schmitt | Dec. 16, 1952 |